US011860974B2

United States Patent
Wang et al.

(10) Patent No.: US 11,860,974 B2
(45) Date of Patent: Jan. 2, 2024

(54) MAXIMIZING THE OPERATIONAL RANGE FOR TRAINING PARAMETERS WHILE SELECTING TRAINING VECTORS FOR A MACHINE-LEARNING MODEL

(71) Applicant: Oracle International Corporation, Redwood Shores, CA (US)

(72) Inventors: Guang C. Wang, San Diego, CA (US); Kenny C. Gross, Escondido, CA (US); Zexi Chen, Mountain View, CA (US)

(73) Assignee: ORACLE INTERNATIONAL CORPORATION, Redwood Shores (CA)

( * ) Notice: Subject to any disclaimer, the term of this patent is extended or adjusted under 35 U.S.C. 154(b) by 640 days.

(21) Appl. No.: 17/090,112

(22) Filed: Nov. 5, 2020

(65) Prior Publication Data

US 2022/0138499 A1    May 5, 2022

(51) Int. Cl.
*G06F 18/00*        (2023.01)
*G06F 18/214*        (2023.01)
(Continued)

(52) U.S. Cl.
CPC ...... *G06F 18/2148* (2023.01); *G06F 11/3075* (2013.01); *G06F 11/3089* (2013.01);
(Continued)

(58) Field of Classification Search
CPC ............. G06F 18/2148; G06F 11/3075; G06F 11/3089; G06F 18/231; G06F 11/3409;
(Continued)

(56) References Cited

U.S. PATENT DOCUMENTS

2006/0195406 A1\*    8/2006  Burges ................... G06F 16/951
                                                707/E17.108
2019/0121714 A1\*    4/2019  Gross ...................... G06F 21/55
(Continued)

OTHER PUBLICATIONS

Agrawal et al., Fast similarity search in the presence of noise scaling and translation in time-series databases, 21st VLDB, pp. 490-501 (Year: 1995).\*

(Continued)

*Primary Examiner* — Ping Y Hsieh
*Assistant Examiner* — Xiao Liu
(74) *Attorney, Agent, or Firm* — Park, Vaughan, Fleming & Dowler LLP (57) ABSTRACT

A system is provided for training an inferential model based on selected training vectors. During operation, the system receives training data comprising observations for a set of time-series signals gathered from sensors in a monitored system during normal fault-free operation. Next, the system divides the observations into N subgroups comprising non-overlapping time windows of observations. The system then selects observations with a local minimum value and a local maximum value for all signals from each subgroup to be training vectors for the inferential model. Finally, the system trains the inferential model using the selected training vectors. Note that by selecting observations with local minimum and maximum values to be training vectors, the system maximizes an operational range for the training vectors, which reduces clipping in estimates subsequently produced by the inferential model and thereby reduces false alarms.

17 Claims, 6 Drawing Sheets

(51) Int. Cl.
  *G06F 11/30*   (2006.01)
  *H04L 9/40*   (2022.01)
  *G06N 5/04*   (2023.01)
  *G06F 18/231*   (2023.01)
  *G06N 7/01*   (2023.01)

(52) U.S. Cl.
  CPC ............ *G06F 18/231* (2023.01); *G06N 5/04* (2013.01); *G06N 7/01* (2023.01); *H04L 63/1416* (2013.01); *H04L 63/1425* (2013.01)

(58) Field of Classification Search
  CPC ............ G06F 11/3466; G06F 18/2115; G06F 21/552; G06N 5/04; G06N 7/01; G06N 20/00; H04L 63/1416; H04L 63/1425
  See application file for complete search history.

(56) References Cited

U.S. PATENT DOCUMENTS

2021/0085256 A1\*   3/2021   Nakajima ............ A61B 5/4812
2021/0285982 A1\*   9/2021   Soejima ............ G06F 18/24137

OTHER PUBLICATIONS

Lazkian et al Anomaly detection in time series data using a fuzzy c-means clustering, Joint IFSA World Congress and NAFIPS Annual Meeting (IFSA/NAFIPS) (Year: 2013).\*
Wikipedia, Training, validation, and test data sets (Year: 2023).\*

\* cited by examiner

MAXIMIZING THE OPERATIONAL RANGE FOR TRAINING PARAMETERS WHILE SELECTING TRAINING VECTORS FOR A MACHINE-LEARNING MODEL

BACKGROUND

Field

The disclosed embodiments generally relate to techniques for using a machine-learning (ML) model to perform prognostic-surveillance operations based on time-series sensor signals from a monitored system. More specifically, the disclosed embodiments relate to a technique, which reduces false alarms during prognostic-surveillance operations by maximizing the operational range of training parameters while selecting training vectors for the ML model.

Related Art

Large numbers of sensors are presently deployed to monitor the operational health of critical assets in a large variety of business-critical systems. For example, a medium-sized computer data center can include over 1,000,000 sensors monitoring thousands of servers, a modern passenger jet can include 75,000 sensors, an oil refinery can include over 1,000,000 sensors, and even an ordinary car can have over 100 sensors. These sensors produce large volumes of time-series sensor data, which can be used to perform prognostic-surveillance operations to facilitate detecting incipient anomalies. This makes it possible to take remedial action before the incipient anomalies develop into failures in the monitored assets.

Machine-learning (ML) techniques are commonly used to perform prognostic-surveillance operations on time-series sensor data, and also for validating the integrity of the sensors themselves. ML-based prognostic-surveillance techniques typically operate by training an ML model (also referred to as an "inferential model") to learn correlations among time-series signals. The trained ML model is then placed in a surveillance mode where it is used to predict values for time-series signals based on the correlations with other time-series signals, wherein deviations between actual and predicted values for the time-series signals trigger alarms that indicate an incipient anomaly. This makes it possible to perform remedial actions before the underlying cause of the incipient anomaly leads to a catastrophic failure.

Existing ML models are typically trained in advance based on archived signals from the assets that are going to be monitored. Moreover, a fundamental requirement for this training is that the training data needs to encompass the full range of parameters an ML-based model will see during surveillance. This is because ML-based models cannot make accurate predictions outside the operational envelope of their training range. For example, suppose an ML model that monitors telemetry data for a car is trained based on a dataset recorded while the car was traveling on flat streets between zero and 30 MPH. If, during a subsequent surveillance mode, the car is driven on a freeway and on hills at speeds in excess of 30 MPH, the ML model will likely produce multiple "anomaly alarms" because the monitored signals will exceed the range in the training dataset.

Unfortunately, in most use cases, monitored time-series signals contain a significant amount of noise, which introduces random variations into signals. This noise originates from two sources: (1) the inherent noise arising from the physics of the processes under surveillance (e.g., turbulent flow, vibrational dynamics, variance in bit-flipping rates in logic chips, combustion dynamics, and other stochastic processes); and (2) measurement noise in the physical sensors that are used to monitor the processes.

This random noise makes it hard to collect sufficient training data to ensure that the full range of all the surveillance data will be encompassed by the training data. Also, because of the stochastic nature of the noise, even if an ML model is trained on a large dataset, the ML model will inevitably encounter noise values in the data during operation that are higher and/or lower than what was seen in training. When this happens, the ML model will only estimate signals to the highest peaks and lowest troughs seen during training. In these situations, the ML model will "clip" the estimates, which leads to false alarms. Note that these false alarms can be costly, because assets can be taken out of service unnecessarily, and needless service requests can be generated in situations where there is no actual degradation in the system under surveillance.

Hence, what is needed is a technique for training an ML model that reduces the likelihood of such clipping-related false alarms.

SUMMARY

The disclosed embodiments relate to a system that trains an inferential model based on selected training vectors. During operation, the system receives training data comprising observations for a set of time-series signals gathered from sensors in a monitored system during normal fault-free operation. Next, the system divides the observations into N subgroups comprising non-overlapping time windows of observations. The system then selects observations with a local minimum value and a local maximum value for all signals from each subgroup to be training vectors for the inferential model. Finally, the system trains the inferential model using the selected training vectors.

In some embodiments, while selecting observations with the local minimum value and the local maximum value for all signals from each subgroup, for all signals the system divides each subgroup into a training set and a validation set by sequencing through consecutive even/odd pairs of observations in the subgroup and assigning one observation in each pair to the training set and another observation in each pair to the validation set. Next, the system swaps members of pairs of observations between the training set and the validation set as necessary to ensure that the local minimum value and the local maximum value for each subgroup always fall into the training set. Finally, the system selects a user-specified number of observations with the local minimum value and the local maximum value from the training set to be the training vectors for the inferential model.

In some embodiments, selecting observations with local minimum and maximum values to be training vectors maximizes an operational range for the training vectors, which reduces clipping in estimates subsequently produced by the inferential model and thereby reduces false alarms.

In some embodiments, the system additionally uses the validation set to tune parameters for the inferential model. During this process, the system evaluates an error function while running the inferential model on observations from the validation set, and keeps parameters of the inferential model that have the smallest errors with respect to the validation set.

In some embodiments, after tuning the inferential model based on the validation set, the system performs a final evaluation of the inferential model by running the inferential model on a testing dataset comprising observations for the set of time-series signals that are independent of the training data.

In some embodiments, during a subsequent surveillance mode, the system uses the inferential model to generate estimated values based on subsequently received time-series signals from the monitored system. Next, the system performs a pairwise differencing operation between actual values and the estimated values for the subsequently received time-series signals to produce residuals. Finally, the system analyzes the residuals to detect the incipient anomalies in the monitored system.

In some embodiments, while analyzing the residuals, the system performs a sequential probability ratio test (SPRT) on the residuals to produce SPRT alarms, and then detects the incipient anomalies based on the SPRT alarms.

In some embodiments, while detecting the incipient anomalies, the system detects one or more of the following: an impending failure of the monitored system; and a malicious-intrusion event in the monitored system.

In some embodiments, the inferential model comprises a Multivariate State Estimation Technique (MSET) model.

DETAILED DESCRIPTION

The following description is presented to enable any person skilled in the art to make and use the present embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the present embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Exemplary Prognostic-Surveillance System

Figure 1:
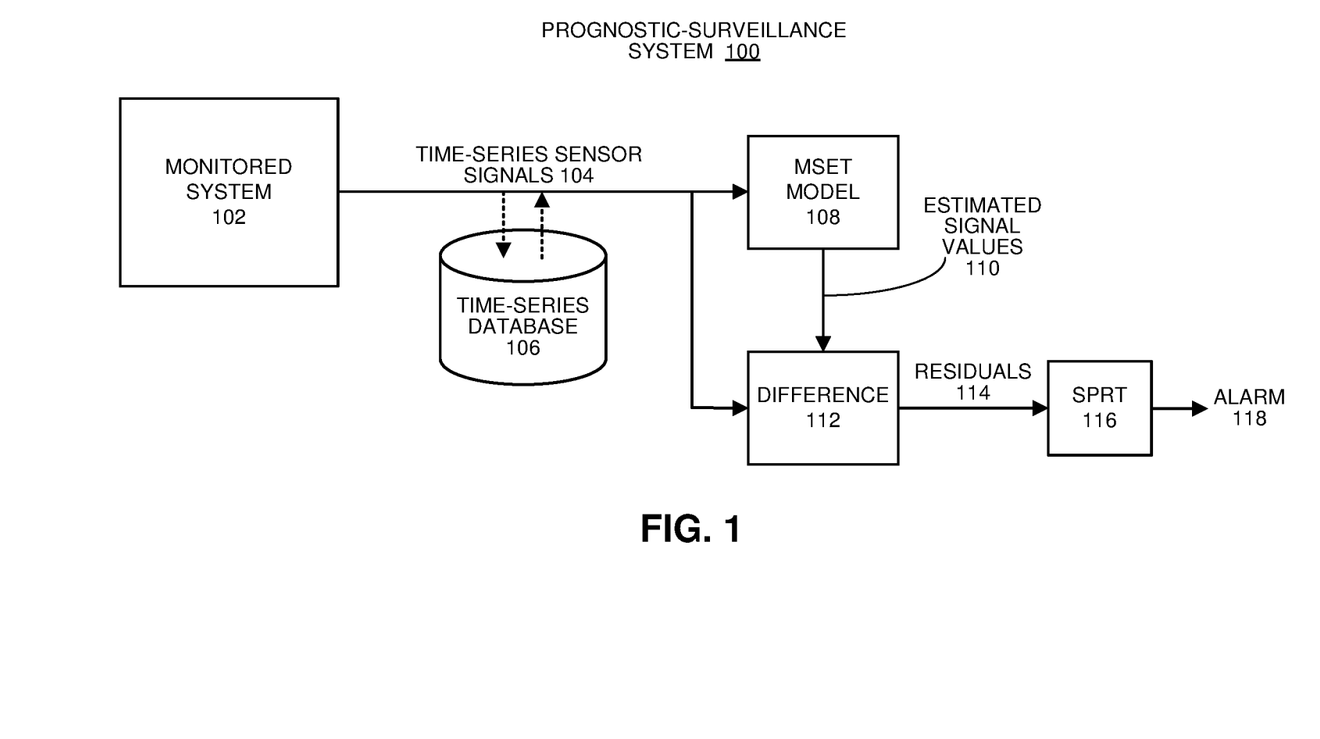
FIG. 1 illustrates an exemplary prognostic-surveillance system in accordance with the disclosed embodiments.

Before describing training-vector-selection techniques further, we first describe an exemplary prognostic-surveillance system in which the techniques can be used. FIG. 1 illustrates a prognostic-surveillance system 100 that accesses a time-series database 106, containing time-series signals in accordance with the disclosed embodiments. As illustrated in FIG. 1, prognostic-surveillance system 100 operates on a set of time-series sensor signals 104 obtained from sensors in a monitored system 102. Note that monitored system 102 can generally include any type of machinery or facility, which includes sensors and generates time-series signals. Moreover, time-series signals 104 can originate from any type of sensor, which can be located in a component in monitored system 102, including: a voltage sensor; a current sensor; a pressure sensor; a rotational speed sensor; and a vibration sensor.

During operation of prognostic-surveillance system 100, time-series signals 104 can feed into a time-series database 106, which stores the time-series signals 104 for subsequent analysis. Next, the time-series signals 104 either feed directly from monitored system 102 or from time-series database 106 into a Multivariate State Estimation Technique (MSET) pattern-recognition model 108. Although it is advantageous to use an inferential model, such as MSET, for pattern-recognition purposes, the disclosed embodiments can generally use any one of a generic class of pattern-recognition techniques called nonlinear, nonparametric (NLNP) regression, which includes neural networks, support vector machines (SVMs), auto-associative kernel regression (AAKR), and even simple linear regression (LR).

Next, MSET model 108 is "trained" to learn patterns of correlation among all of the time-series signals 104. This training process involves a one-time, computationally intensive computation, which is performed offline with accumulated data that contains no anomalies. The pattern-recognition system is then placed into a "real-time surveillance mode," wherein the trained MSET model 108 predicts what each signal should be, based on other correlated variables; these are the "estimated signal values" 110 illustrated in FIG. 1. Next, the system uses a difference module 112 to perform a pairwise differencing operation between the actual signal values and the estimated signal values to produce residuals 114. The system then performs a "detection operation" on the residuals 114 by using SPRT module 116 to detect anomalies and possibly to generate an alarm 118. (For a description of the SPRT model, please see Wald, Abraham, June 1945, "Sequential Tests of Statistical Hypotheses." *Annals of Mathematical Statistics*. 16 (2): 117-186.) In this way, prognostic-surveillance system 100 can proactively alert system operators to incipient anomalies, such as impending failures, hopefully with enough lead time so that such problems can be avoided or proactively fixed.

Figure 2:
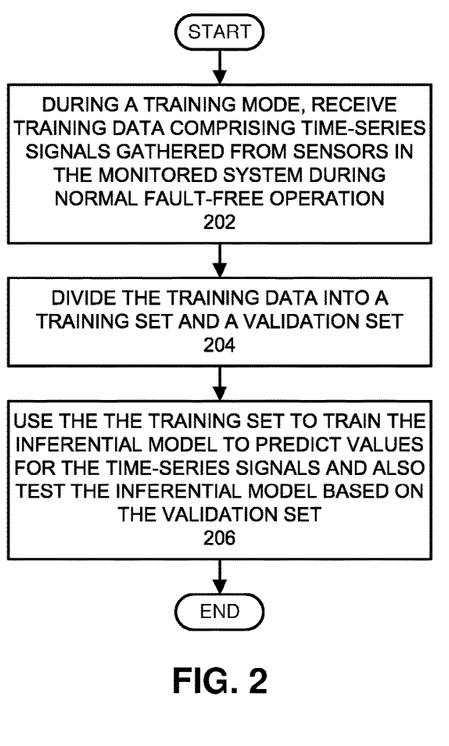
FIG. 2 presents a flow chart illustrating a process for training an inferential model in accordance with the disclosed embodiments.
Figure 3:
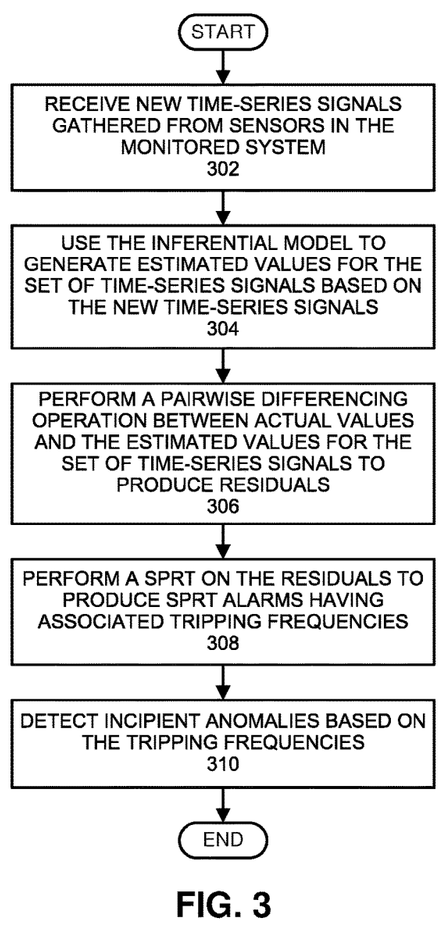
FIG. 3 presents a flow chart illustrating a process for using an inferential model to perform prognostic-surveillance operations in accordance with the disclosed embodiments.

The prognostic surveillance system 100 illustrated in FIG. 1 operates generally as follows. During a training mode, which is illustrated in the flow chart in FIG. 2, the system receives a training set comprising time-series signals gathered from sensors in the monitored system under normal fault-free operation (step 202). Next, the system divides the training data into a training set and a validation set (step 204). The system then trains the inferential model to predict values of the time-series signals based on the training set, and also tests the inferential model based on the validation set (step 206). During a subsequent surveillance mode, which is illustrated by the flow chart in FIG. 3, the system receives new time-series signals gathered from sensors in the monitored system (step 302). Next, the system uses the inferential model to generate estimated values for the set of time-series signals based on the new time-series signals (step 304). The system then performs a pairwise differencing operation between actual values and the estimated values for the set of time-series signals to produce residuals (step 306). The system then analyzes the residuals to detect the incipient anomalies in the monitored system. This involves performing a SPRT on the residuals to produce SPRT alarms with associated tripping frequencies (step 308), and then detecting incipient anomalies based on the tripping frequencies (step 310). Note that these incipient anomalies can be associated with an impending failure of the monitored system, or a malicious-intrusion event in the monitored system.

Selecting Training Vectors

Inferential models are typically trained using a "training dataset" comprising archived signals that were recorded while the system under surveillance has no degradation. It is also desirable for the signals in the training dataset to span the full operating range that the signals will exhibit during a subsequent surveillance operation that uses the trained model. However, this requirement presents challenges when the time-series signals originate from physical sensors. This happens when the highest and lowest signal values are created by random noise values, which are superimposed on underlying physically measured sensor values. More specifically, this happens when the monitored signals are stationary in time in the statistical sense where there is a nominally fixed mean with superimposed noise that is a sum of process noise in the parameter being monitored plus measurement noise. It also happens whenever the monitored signals are at their highest performance duty setting or lowest performance duty setting, but are still subject to process noise and/or measurement noise.

In these circumstances, because of the finite time range during which training data is collected, there is a likelihood that noise values will go outside the training range during subsequent surveillance operations, which will trigger false alarms. When the surveillance data has extrema values that are higher or lower than seen during training, this gives rise to "clipping" of the ML estimates, which will not predict outside the training range. (Note that we still make a prediction in this case, but we only predict a value that is very close to the edge of (but not outside) the training range. This clipping causes blips in the residuals that lead to nuisance false alarms, which can be costly because they often cause revenue-generating assets to be taken out of service unnecessarily.

Our system maintains a training database comprised of time-series signals for a monitored asset gathered during normal fault-free operation. The training database is divided into three different datasets: (1) a training dataset, (2) a validation dataset, and (3) a testing dataset. The training dataset comprises selected vectors that are used to train the model.

The validation dataset comprises data, which is used to provide an unbiased evaluation of a model fit while tuning model parameters. During this tuning process, the performance of a model is validated and tested by evaluating an error function using a set of validation vectors, which is independent of the training vectors, wherein the system keeps model parameters that generate the smallest errors with respect to the validation set.

The testing dataset comprises data that is independent of the training and validation set. It is used to provide an unbiased evaluation of a finalized model, which was previously fitted on the training dataset. The testing dataset typically comprises a small portion of the overall training database (10% is common). It is often advantageous to obtain the testing dataset from the tail end of the training database. This is because if there exists a slow drift in any of the signals in the training database, one maximizes the chances of catching this trend by using a testing dataset, which is taken from the last data in the archive of training data. However, note that the testing dataset can possibly be taken from the front end or tail end of the training database, and can include more or less than 10% of the training database.

While there is no hard rule about what fraction to use in splitting observations between the training vectors and validation vectors, it is common to designate at least as many training vectors as validation vectors (i.e., a 50/50 split). However, when the training database is small, it is typical to use more of the available training data as training vectors, and less as validation vectors. For example, in these situations, 70/30 and 80/20 splits are common. In the disclosed embodiments, we use a 50/50 split and we subgroup the observations at even and odd indices into the training set and validation set, respectively. While it is preferable to pick the local extrema of the training measurements to be the training vectors, prior approaches do not ensure that the extrema values in the training database always go into the training dataset.

To address this problem, we have developed a new technique that sequences through the even/odd pairs of observations in a series of non-overlapping time windows in the training data. If both values are not extrema, we stay with the conventional approach by having one of them go into the training dataset. On the other hand, if one value in the pair is an extrema that is larger in absolute value than the other, we put the larger one in the training dataset, and the other one goes into the validation dataset regardless of which one is even or odd. We repeat this process through consecutive non-overlapping windows, which guarantees the local extrema values in each window always fall into the training dataset, and the validation dataset contains almost exactly the same data as it would have using a less-sophisticated division of the training database into training vectors and validation vectors. Hence, our new technique ensures that for each time window, there exist no extrema in the validation vectors that are greater in absolute value than the time window's extrema in the training vectors. This makes it statistically less likely that the surveillance data will fall outside of the training range, which significantly reduces the clipping phenomena, and thereby reduces the false alarms during prognostic surveillance operations.

Detailed Flow Chart for the Process of Selecting Training Vectors

Figure 4A:
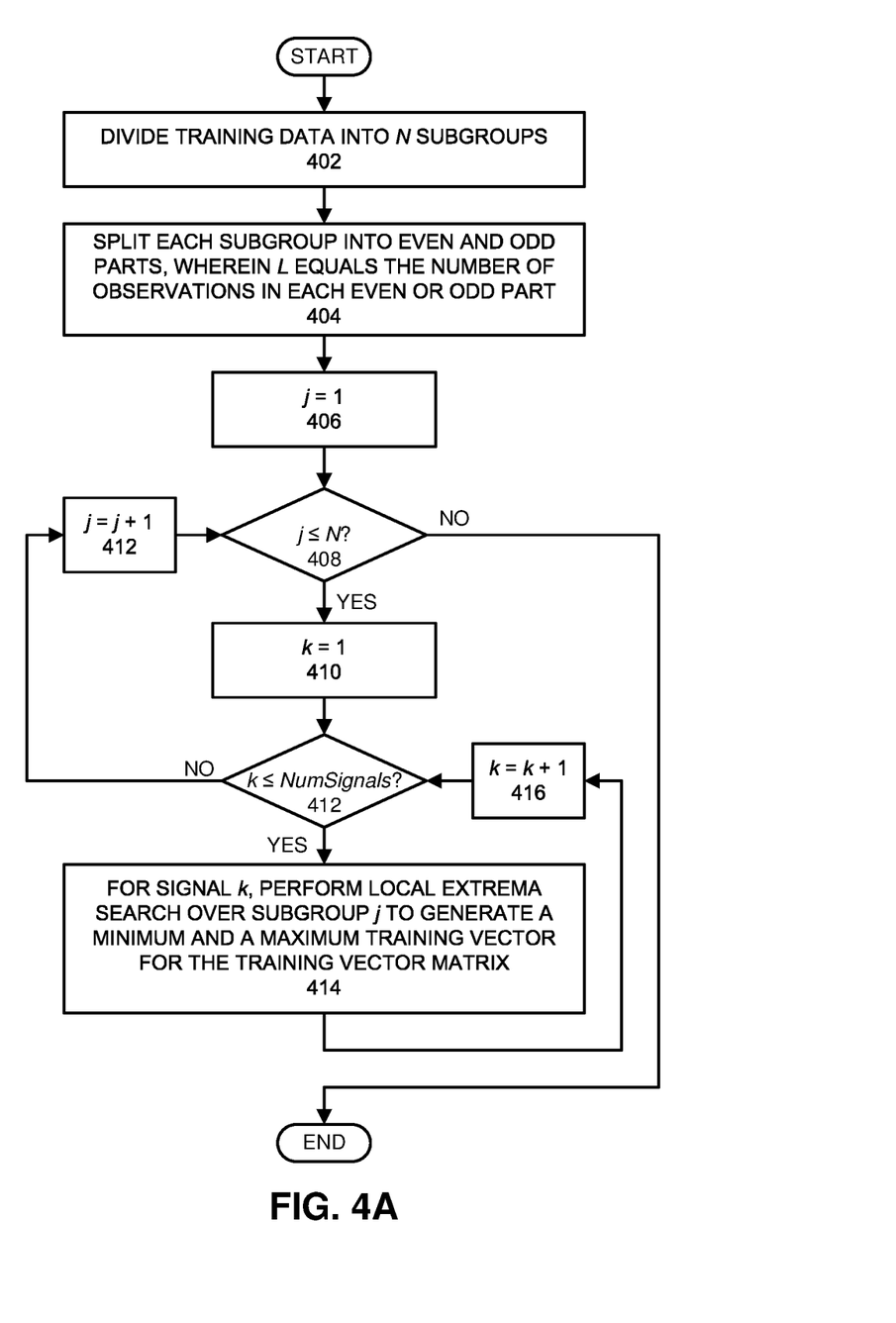
FIG. 4A presents a detailed flow chart illustrating a process for selecting training vectors for an ML model in accordance with the disclosed embodiments.

FIG. 4A presents a detailed flow chart illustrating a process for selecting training vectors for an ML model in accordance with the disclosed embodiments. First, the system divides the training data into N subgroups (step 402). Next, the system splits each subgroup into even and odd parts, wherein L equals the number of observations in each even or odd part (step 404). The system then iterates over all N subgroups (steps 406, 408 and 412) and within each subgroup iterates over each signal (steps 410, 412 and 416) and performs a local extrema search for each subgroup to generate a minimum and a maximum training vector for the training vector matrix (step 414).

Figure 4B:
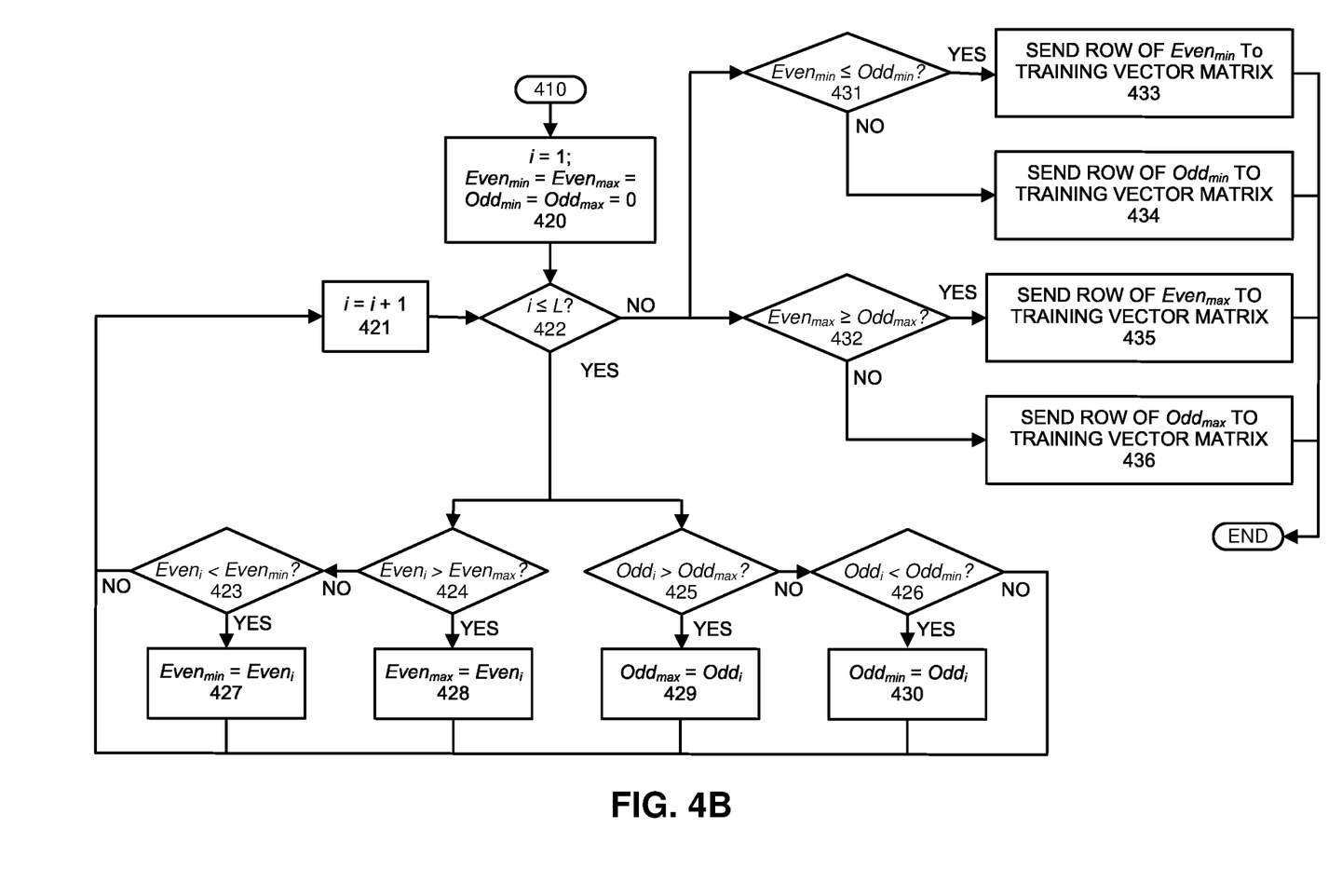
FIG. 4B presents a detailed flow chart illustrating a process for performing an exhaustive search to facilitate selecting training vectors at local extrema for an ML model in accordance with the disclosed embodiments.

FIG. 4B presents a flow chart illustrating a process for performing an extrema search to facilitate selecting training vectors for an ML model in accordance with the disclosed embodiments. (Note that FIG. 4B illustrates operations that take place during step 410 in the flow chart that appears in FIG. 4A). First, the system initializes a counter variable i and also initializes the minimum and maximum parameter variables $Even_{min}$, $Even_{max}$, $Odd_{min}$ and $Odd_{max}$ (step 420). Note that the "Even" and "Odd" labels indicate which part the variable is in (see step 404), and the subscript indicates the local extrema with reference to the subgroup. The system then iterates over all even and odd rows in the subgroup and identifies the minimum and maximum values, namely $Even_{min}$, $Even_{max}$, $Odd_{min}$ and $Odd_{max}$ (steps 421 to 430). Next, the system determines if $Even_{min} \leq Odd_{min}$ (step 431). If so, the system sends the row of $Even_{min}$ to the training vector matrix (step 433) and the row of $Odd_{min}$ to the validation matrix. Otherwise, the system sends the row of $Odd_{min}$ to the training vector matrix (step 434) and the row of $Even_{min}$ to the validation matrix. The system also determines if $Even_{max} \geq Odd_{max}$ (step 432). If so, the system sends the row of $Even_{max}$ to the training vector matrix (step 435) and the row of $Odd_{max}$ to the validation matrix. Otherwise, the system sends the row of $Odd_{max}$ to the training vector matrix (step 436) and the row of $Even_{max}$ to the validation matrix.

EXAMPLE

Figure 5:
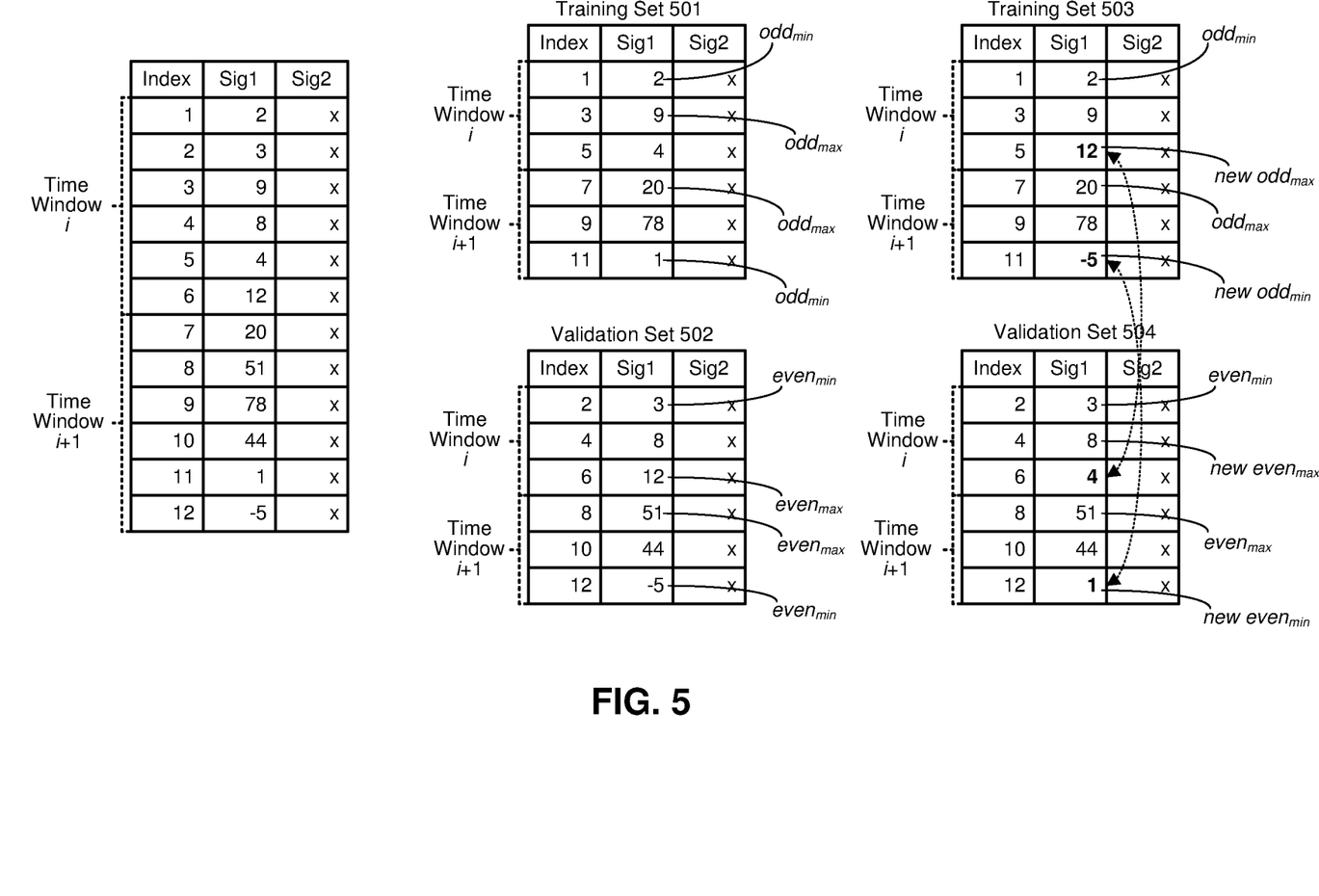
FIG. 5 illustrates an example of the process of selecting training vectors for an inferential model in accordance with the disclosed embodiments.

FIG. 5 illustrates a comparison on the process of selecting training vectors for an inferential model between the conventional approach and our new innovative approach in accordance with the disclosed embodiments. In this example, we have a dataset comprising 12 observations and two signals, which is divided into two time windows (i and i+1) having six observations each. Note that in the conventional approach, the odd-numbered observations are used for training and the even-numbered observations are used for validation, or vice versa. Hence, the signals are divided into a training set 501 and a validation set 502 as is illustrated in the middle column of FIG. 5. Note that in time window i, training set 501 has $odd_{min}=2$ and $odd_{max}=9$. Under a naïve approach, the row for $odd_{min}=2$ and the row for $odd_{max}=9$ are selected to be training vectors.

However, under our new approach, which is illustrated in the right-side column in FIG. 5, because $even_{max}=12$ for time window i in validation set 502 is greater than $odd_{max}=9$ in training set 501, their respective rows are swapped as is illustrated by the dashed line between observation 5 and observation 6. Also, in the next iteration, because the $even_{min}=-5$ for time window i+1 in validation set 502 is less than $odd_{min}=1$ in training set 501 in the same time window, their respective rows are swapped as is illustrated by the dashed line between observation 11 and observation 12. After these swapping operations are complete, training set 503 contains the local extrema values ($odd_{min}=2$ and new $odd_{max}=12$ for time window i and new $odd_{min}=-5$ and $odd_{max}=20$ for time window i+1), and the corresponding rows for these extrema values are selected to be training vectors.

High-Level Flow Chart for the Process of Selecting Training Vectors

Figure 6:
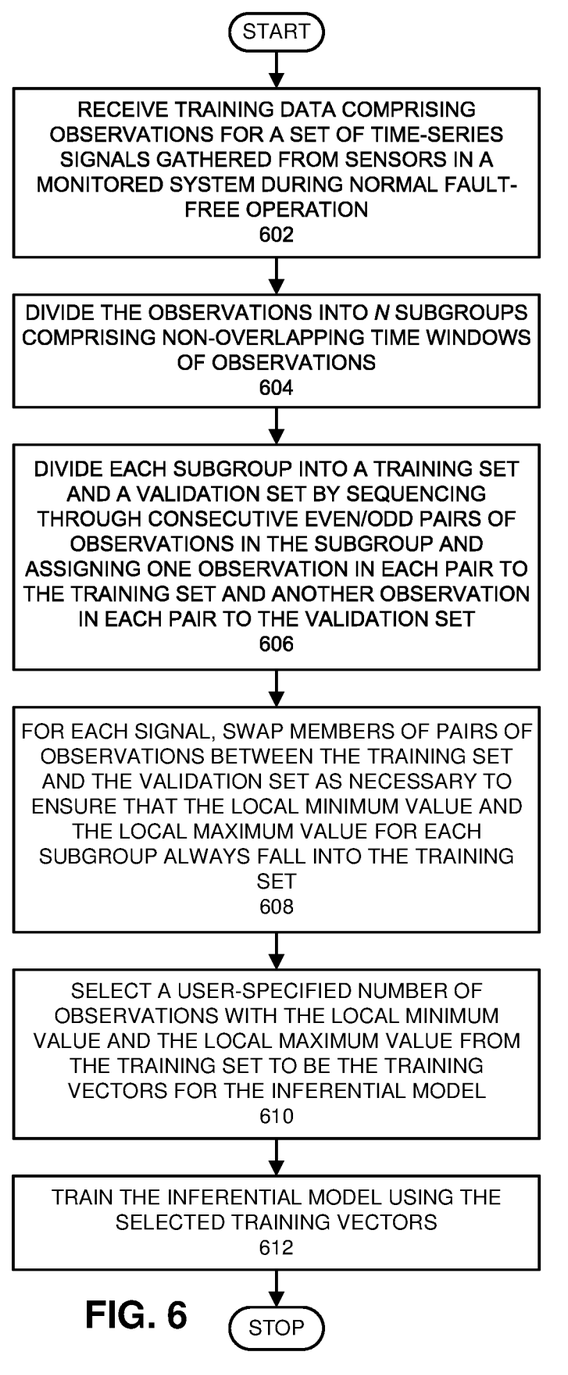
FIG. 6 presents a high-level flow chart illustrating a process for selecting training vectors for an ML model in accordance with the disclosed embodiments.

FIG. 6 presents a high-level flow chart illustrating a process for selecting training vectors for an ML model in accordance with the disclosed embodiments. During operation, the system receives training data comprising observations for a set of time-series signals gathered from sensors in a monitored system during normal fault-free operation (step 602). Next, the system divides the observations into N subgroups comprising non-overlapping time windows of observations (step 604). The system then divides each subgroup into a training set and a validation set by sequencing through consecutive even/odd pairs of observations in the subgroup and assigning one observation in each pair to the training set and another observation in each pair to the validation set (step 606). Next, for each single signal, the system swaps members of pairs of observations between the training set and the validation set as necessary to ensure that the local minimum value and the local maximum value for each subgroup always fall into the training set (step 608). The system then selects a user-specified number of observations with the local minimum value and the local maximum value from the training set to be the training vectors for the inferential model (step 610). Finally, the system trains the inferential model using the selected training vectors (step 612).

Results

FIGS. 7A and 7B present graphs that compare the conventional approach and our new approach for optimally selecting the local extrema values. More specifically, FIG. 7A presents a graph illustrating results obtained using a naïve selection algorithm. Note that in the second and third window (see observations 100 to 300), neither the minimum nor the maximum values were selected. Moreover, the unselected minimum values happen to be the minimum values for the entire training dataset. Because these minimum values are not used for training, we see a clipping phenomena in the projected estimates (see observations 500 to 600 and observations around 800).

FIG. 7B illustrates the improvement that can be obtained by using our new approach. This new approach ensures that the minimum and maximum values in all time windows appear in the training data (see observations 0 to 500). This causes the residuals between MSET estimates and testing data to be much smaller, because estimate-clipping is significantly reduced in comparison to the naïve approach illustrated in FIG. 7A where the monitored signals contain noise (see observations 501-1000).

Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The foregoing descriptions of embodiments have been presented for purposes of illustration and description only.

They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for training an inferential model based on selected training vectors, comprising:
receiving training data comprising observations for a set of time-series signals gathered from sensors in a monitored system during normal fault-free operation;
dividing the observations into N subgroups comprising non-overlapping time windows of observations;
selecting observations with a local minimum value and a local maximum value for all signals from each subgroup to be training vectors for the inferential model by:
dividing each subgroup into a training set and a validation set by sequencing through consecutive even/odd pairs of observations in the subgroup and assigning one observation in each pair to the training set and another observation in each pair to the validation set;
swapping members of pairs of observations between the training set and the validation set as necessary to ensure that the local minimum value and the local maximum value for each subgroup fall into the training set; and
selecting a user-specified number of observations with the local minimum value and the local maximum value from the training set to be the training vectors for the inferential model; and
training the inferential model using the selected training vectors.

2. The method of claim 1, wherein selecting observations with local minimum and maximum values to be training vectors maximizes an operational range for the training vectors, which reduces clipping in estimates subsequently produced by the inferential model and thereby reduces false alarms.

3. The method of claim 1, wherein the method further comprises using the validation set to tune parameters for the inferential model by:
evaluating an error function while running the inferential model on observations from the validation set; and
keeping parameters of the inferential model that have the smallest errors with respect to the validation set.

4. The method of claim 3, wherein after tuning the inferential model based on the validation set, the method further comprises performing a final evaluation of the inferential model by running the inferential model on a testing dataset comprising observations for the set of time-series signals that are independent of the training data.

5. The method of claim 1, wherein during a surveillance mode, the method further comprises:
using the inferential model to generate estimated values based on subsequently received time-series signals from the monitored system;
performing a pairwise differencing operation between actual values and the estimated values for the subsequently received time-series signals to produce residuals; and
analyzing the residuals to detect the incipient anomalies in the monitored system.

6. The method of claim 5, wherein analyzing the residuals involves:
performing a sequential probability ratio test (SPRT) on the residuals to produce SPRT alarms; and
detecting the incipient anomalies based on the SPRT alarms.

7. The method of claim 5, wherein detecting the incipient anomalies in the monitored system comprises detecting one or more of the following:
an impending failure of the monitored system; and
a malicious-intrusion event in the monitored system.

8. The method of claim 1, wherein the inferential model comprises a Multivariate State Estimation Technique (MSET) model.

9. A non-transitory computer-readable storage medium storing instructions that when executed by a computer cause the computer to perform a method for training an inferential model based on selected training vectors, the method comprising:
receiving training data comprising observations for a set of time-series signals gathered from sensors in a monitored system during normal fault-free operation;
dividing the observations into N subgroups comprising non-overlapping time windows of observations;
selecting observations with a local minimum value and a local maximum value for all signals from each subgroup to be training vectors for the inferential model by:
dividing each subgroup into a training set and a validation set by sequencing through consecutive even/odd pairs of observations in the subgroup and assigning one observation in each pair to the training set and another observation in each pair to the validation set;
swapping members of pairs of observations between the training set and the validation set as necessary to ensure that the local minimum value and the local maximum value for each subgroup fall into the training set; and
selecting a user-specified number of observations with the local minimum value and the local maximum value from the training set to be the training vectors for the inferential model; and
training the inferential model using the selected training vectors.

10. The non-transitory computer-readable storage medium of claim 9, wherein selecting the observations with local minimum and maximum values to be training vectors maximizes an operational range for the training vectors, which reduces clipping in estimates subsequently produced by the inferential model and thereby reduces false alarms.

11. The non-transitory computer-readable storage medium of claim 9, wherein the method further comprises using the validation set to tune parameters for the inferential model by:
evaluating an error function while running the inferential model on observations from the validation set; and
keeping parameters of the inferential model that have the smallest errors with respect to the validation set.

12. The non-transitory computer-readable storage medium of claim 11, wherein after tuning the inferential model based on the validation set, the method further comprises performing a final evaluation of the inferential model by running the inferential model on a testing dataset comprising observations for the set of time-series signals that are independent of the training data.

13. The non-transitory computer-readable storage medium of claim 11, wherein during a surveillance mode, the method further comprises:
- using the inferential model to generate estimated values based on subsequently received time-series signals from the monitored system;
- performing a pairwise differencing operation between actual values and the estimated values for the subsequently received time-series signals to produce residuals; and
- analyzing the residuals to detect the incipient anomalies in the monitored system.

14. The non-transitory computer-readable storage medium of claim 13, wherein analyzing the residuals involves:
- performing a sequential probability ratio test (SPRT) on the residuals to produce SPRT alarms; and
- detecting the incipient anomalies based on the SPRT alarms.

15. The non-transitory computer-readable storage medium of claim 13, wherein detecting the incipient anomalies in the monitored system comprises detecting one or more of the following:
- an impending failure of the monitored system; and
- a malicious-intrusion event in the monitored system.

16. A system that trains an inferential model based on selected training vectors, comprising:
- at least one processor and at least one associated memory; and
- a training mechanism that executes on the at least one processor, wherein during operation, the training mechanism trains an inferential model based on selected training vectors, wherein during the training process, the training mechanism:
    - receives training data comprising observations for a set of time-series signals gathered from sensors in a monitored system during normal fault-free operation;
    - divides the observations into N subgroups comprising non-overlapping time windows of observations;
    - selects observations with a local minimum value and a local maximum value for all signals from each subgroup to be training vectors for the inferential model by:
        - dividing each subgroup into a training set and a validation set by sequencing through consecutive even/odd pairs of observations in the subgroup and assigning one observation in each pair to the training set and another observation in each pair to the validation set;
        - swapping members of pairs of observations between the training set and the validation set as necessary to ensure that the local minimum value and the local maximum value for each subgroup fall into the training set; and
        - selecting a user-specified number of observations with the local minimum value and the local maximum value from the training set to be the training vectors for the inferential model; and
    - trains the inferential model using the selected training vectors.

17. The system of claim 16, wherein selecting observations with local minimum and maximum values to be training vectors maximizes an operational range for the training vectors, which reduces clipping in estimates subsequently produced by the inferential model and thereby reduces false alarms.

* * * * *